Patented Oct. 27, 1953

2,657,212

UNITED STATES PATENT OFFICE 2,657,212

DIETHANOLAMINOPYRIDINES

Frederick Charles Copp, London, England, assignor to Burroughs Wellcome & Co. (U. S. A.) Inc., Tuckahoe, N. Y., a corporation of New York No Drawing. Application October 18, 1951, Serial No. 252,000. In Great Britain October 19, 1950

4 Claims. (Cl. 260—295)

The present invention comprises a family of pyridine derivatives represented by Formula I.

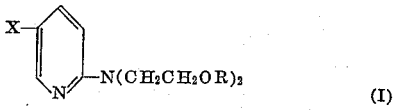

where X is a radical selected from the class consisting of the nitro group and chlorine and R is a radical of the class consisting of the lower aliphatic acyl radicals and hydrogen. These substances are of value in the treatment of mammalian and human amebiasis and also show activity against the human parasite *Trichomonas vaginalis* and the organism *Histomonas meleagridis* (which causes blackhead in turkeys).

It will be seen that in effect this family of compounds consists of the 5-nitro and 5-chloro-2-(bis-β-hydroxyethyl)aminopyridines and the esters thereof with lower fatty acids. It is probable that the esters act through hydrolysis to the parent substances since corresponding esters of benzoic acid (which would be expected to be less rapidly hydrolyzed) are inactive. They may be employed as the free bases or as salts with non-toxic acids and such salts are considered to be equivalent to the bases.

The compounds of the present invention may be made by any suitable or convenient synthetic route. Conveniently they may be made starting from a suitable derivative of pyridine and having a reactive group (for example a chloro- or a bromo- group) in the 2-position (that is the position to be occupied by the

group), which is then reacted with diethanolamine in the presence of a mineral acid binding agent (for example excess diethanolamine or sodium acetate). In the case where X is a chloro group however, chlorine in the 2-position is found not to be sufficiently reactive, and the 2-bromo derivative should be used. The reaction may be carried out in a solvent (for example ethanol or pyridine) or merely in excess diethanolamine which then functions both as a reaction medium and an acid binding agent. Conversion of the bishydroxyethylamino derivatives to their esters can be accomplished by conventional methods.

These compounds, in addition to having valuable activity against the micro-organisms mentioned above, possess extraordinarily low toxicity to the hosts.

Example 1

2-chloro-5-nitropyridine (100 g.) (Phillips, J., 1941, 12) and anhydrous sodium acetate (52.5 g.) were added to a solution of diethanolamine (90 g.) in ethanol (200 ml.) and the resulting mixture heated to reflux for 7 hours. The sodium chloride which separated during this time was filtered and the filtrate stood at 0°, when a solid separated. This was filtered and stirred at room temperature with 4 N-hydrochloric acid (200 ml.). The bulk of the solid dissolved, the insoluble impurities being removed by stirring with charcoal and filtering. The clear filtrate was neutralized with concentrated aqueous ammonia to give a thick yellow precipitate of almost pure 2-diethanolamino-5-nitropyridine. After cooling, this was collected, washed with cold water and recrystallized from hot water which contained 10% of ethanol. Finally it was dried at 100° under reduced pressure to give yellow crystals, melting point 104–105° (yield 106 g.).

Example 2

Diethanolamine (6 g.) and 2-bromo-5-chloropyridine (5 g.) (Case, J. Amer. Chem. Soc., 1946, 68, 2576) were heated together in a sealed tube at 170° for 6 hours. After cooling, the contents of the tube were poured into water which was then extracted several times with ether. The combined ethereal extracts were evaporated and excess 2 N-hydrochloric acid added to the residue, when unchanged 2-bromo-5-chloropyridine crystallized. This was filtered and the filtrate evaporated in vacuo. The crystalline residue was recrystallized from a mixture of ethanol and ether to give pure 5-chloro-2-diethanolaminopyridine hydrochloride, melting point 141–142° C.

Example 3

2-diethanolamino-5-nitropyridine (10 g.) (prepared as described in Example 1) and acetic anhydride (50 ml.) were heated together on a steam-bath for 3 hours. The resulting solution was poured into ethanol, the mixture warmed to remove the excess acetic anhydride and then evaporated under reduced pressure. The residue of 2-diethanolamine-5-nitropyridine diacetate crystallised on addition of n-propanol, forming yellow needles. It could be recrystallised from ethanol, and had a melting point of 93°.

I claim:

1. A compound of the formula

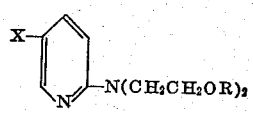

wherein X is a radical selected from the class consisting of the nitro group and chlorine and R is a radical of the class consisting of the lower aliphatic acyl radicals and hydrogen.
2. 5-nitro-2-(bishydroxyethyl) aminopyridine.
3. 5-nitro-2-(bisacetoxyethyl) aminopyridine.
4. 5-chlor-2-(bishydroxyethyl) aminopyridine.

FREDERICK CHARLES COPP.

No references cited.